(12) United States Patent
Murase et al.

(10) Patent No.: US 6,874,124 B2
(45) Date of Patent: Mar. 29, 2005

(54) ELECTRONIC DOCUMENT PROCESSING SYSTEM AND ELECTRONIC DOCUMENT PROCESSORS

(75) Inventors: Takeo Murase, Hyogo (JP); Masanori Shigeta, Hyogo (JP)

(73) Assignee: Fujitsu Limited, Kawasaki (JP)

( * ) Notice: Subject to any disclaimer, the term of this patent is extended or adjusted under 35 U.S.C. 154(b) by 706 days.

(21) Appl. No.: 09/752,522

(22) Filed: Jan. 3, 2001

(65) Prior Publication Data

US 2001/0049705 A1 Dec. 6, 2001

(30) Foreign Application Priority Data

May 31, 2000 (JP) ...................................... 2000-161755

(51) Int. Cl.⁷ .............................................. G06F 17/00
(52) U.S. Cl. .................... 715/530; 715/511; 707/103 R
(58) Field of Search ................................ 715/530, 511; 707/103 R; 345/751

(56) References Cited

U.S. PATENT DOCUMENTS

| | | | | |
|---|---|---|---|---|
| 5,008,853 A | * | 4/1991 | Bly et al. .................... | 345/751 |
| 5,181,162 A | * | 1/1993 | Smith et al. ................ | 715/530 |
| 5,280,574 A | * | 1/1994 | Mizuta et al. .............. | 715/511 |
| 5,893,128 A | * | 4/1999 | Nauckhoff ................... | 715/511 |
| 6,088,702 A | * | 7/2000 | Plantz et al. ............ | 707/103 R |
| 6,366,933 B1 | * | 4/2002 | Ball et al. ................... | 715/511 |
| 6,632,251 B1 | * | 10/2003 | Rutten et al. ............... | 715/530 |

* cited by examiner

Primary Examiner—Joseph Feild
Assistant Examiner—James H. Blackwell

(57) ABSTRACT

There is provided an electronic document processing system which includes a plurality of electronic document processors connected to each other by a network, and makes it possible to track electronic documents even when derivative electronic documents are generated. Reception means receives an electronic document transmitted from another of the electronic document processors. Processing means carries out predetermined processing on the received electronic document. First storage means generates a log of the predetermined processing carried out by the processing means, and stores the log in a predetermined resource. Derivative electronic document generation means generates a derivative electronic document which is a new electronic document derived from the electronic document, according to a result of the predetermined processing carried out by the processing means. Second storage means stores information indicating a correlation between the electronic document and the derivative electronic document in a predetermined resource, when the derivative electronic document is generated. Transmission means transmits the electronic document processed by the processing means and the derivative electronic document generated by the derivative electronic document generation means to a next one of the electronic document processors. A tracking request for tracking an electronic document is input by tracking request entry means. When a tracking request is made, status display means obtains and displays a status of the electronic document to be tracked, by referring to logs and the information indicating the correlation between the electronic document and the derivative electronic document.

7 Claims, 29 Drawing Sheets

| ORDER SLIP | /70 |
|---|---|
| SLIP NO. | 0001 |
| PRODUCT NAME | CIRCUIT BOARD A |
| ORDER Co. | ○×ELECTRONICS |
| ORDERER'S NAME: | AOZORA DAISUKE |
| QUANTITY | 5,000 |
| DELIVERY DATE | JUNE 10 |

FIG. 14

| SLIP LOG ID | PROCESS ID | INTERNAL-PROCESS SERIAL NUMBER | SLIP LOG LOCATION |
|---|---|---|---|
| ID0001 | 1 | — | PointerA |

FIG. 15

```
              ┌80
    ┌─────────────────────────────────┐
    │ ORDER SLIP                      │
    ├─────────────────────────────────┤
    │ SLIP NO.           0001-1       │
    │                                 │
    │ PRODUCT NAME       CIRCUIT BOARD A │
    │                                 │
    │ ORDER Co.          O×ELECTRONICS│
    │                                 │
    │ ORDERER'S NAME:    AOZORA DAISUKE│
    │                                 │
    │ QUANTITY           5,000        │
    │                                 │
    │ DELIVERY DATE      JUNE 5       │
    └─────────────────────────────────┘
```

FIG. 16

| CHILD SLIP | ISSUANCE PROCESS |
|---|---|
| 0001-1 | P1 |
| 0001-2 | P1 |
| 0001-3 | P1 |

FIG. 17 (A)

| PARENT SLIP | ISSUANCE PROCESS |
|---|---|
| 0001 | P1 |

ORDER SLIP

| | |
|---|---|
| SLIP NO. | 0001-1 |
| PRODUCT NAME | CIRCUIT BOARD A |
| ORDER Co. | O×ELECTRONICS |
| ORDERER'S NAME: | AOZORA DAISUKE |
| QUANTITY | 5,000 |
| DELIVERY DATE | JUNE 5 |
| ORDER DATE | MAY 10 9:15 |
| PERSON IN CHARGE | NAGAI SOUICHIROU |

| ORDER SLIP | |
|---|---|
| SLIP NO. | 0001-1-1 |
| PRODUCT NAME | CPUA |
| ORDER Co. | O×PARTS |
| ORDERER'S NAME: | NAGAI SOUICHIROU |
| QUANTITY | 5,000 |
| DELIVERY DATE | JUNE 1 |

FIG. 19

| LOG ID | ACCESS CHECK KEY |
|--------|------------------|
| ID0001 | XXXXX |
| ID0002 | YYYYY |
| ID0003 | ZZZZZ |

FIG. 24(A)

| KINDS OF INFORMATION | ACCESS CHECK KEY |
|----------------------|------------------|
| ORDINARY INFORMATION | FREE (NO INFORMATION) |
| SECRET INFORMATION #1 | XXXXX1 |
| SECRET INFORMATION #2 | YYYYY1 |

FIG. 24(B)

ELECTRONIC DOCUMENT PROCESSING SYSTEM AND ELECTRONIC DOCUMENT PROCESSORS

BACKGROUND OF THE INVENTION (1) Field of the Invention

This invention relates to an electronic document processing system and an electronic document processor therefor, and more particularly to an electronic document processing system comprised of a plurality of electronic document processors connected to each other by a network, and an electronic document processor for the system.

(2) Description of the Related Art

A large number of documents are transmitted and received between companies and within each company, for daily operations. Among these documents, there are many which are circulated in a predetermined order for confirmation or denial, such as slips, circulars for approval of decisions, and statements of accounts for traveling expenses.

Recently, a work flow management method has been spreading itself into a large number of companies. According to the work flow management method, a flow of such documents is computerized, thereby allowing computerized or electronic documents to be circulated through personal computers for processing, instead of paper documents being carried by office workers.

Many of work flow management systems are capable of tracking which document is now being processed at what processing stage, while retaining a high level of security.

Now, in processing documents typified by slips, new documents are often derived as demanded by the processing. In the case of processing slips, for instance, if an order for a certain completed product is placed with a company, the company who has received the order places orders for parts with its subcontractors who manufacture components of the completed product, and the subcontractors further places orders for parts with secondary subcontractors under the subcontractors. Thus, an order slip for ordering a certain completed product generates a plurality of order slips sent out to subcontractors or secondary subcontractors.

Documents derived from a certain document do not maintain continuity with the certain or original document, and conventionally, the derived documents have been handled as quite different documents from the original document. Therefore, it has been difficult to perform the above tracking operation on the derived documents.

SUMMARY OF THE INVENTION

The present invention has been made in view of the above circumstances, and an object thereof is to provide an electronic document processing system that enables tracking of derived documents as well.

To attain the above object, there is provided an electronic document processing system which includes a plurality of electronic document processors connected to each other by a network. In the electronic document processing system, each of the electronic document processors comprises reception means for receiving an electronic document transmitted from another of the electronic document processors, processing means for carrying out predetermined processing on the electronic document received by the reception means, first storage means for generating a log of the predetermined processing carried out by the processing means, and storing the log in a predetermined resource, derivative electronic document generation means for generating a derivative electronic document which is a new electronic document derived from the electronic document, according to a result of the predetermined processing carried out by the processing means, second storage means for storing information indicating a correlation between the electronic document and the derivative electronic document in a predetermined resource, when the derivative electronic document is generated by the derivative electronic document generation means, and transmission means for transmitting the electronic document processed by the processing means and the derivative electronic document generated by the derivative electronic document generation means to a next one of the electronic document processors.

The above and other objects, features and advantages of the present invention will become apparent from the following description when taken in conjunction with the accompanying drawings which illustrate preferred embodiments of the present invention by way of example.

BRIEF DESCRIPTION OF THE DRAWINGS

FIG. 14 is a diagram illustrating an example of a slip generated based on entries carried out via the FIG. 13 entry screen;

FIG. 15 is a diagram illustrating an example of a log management table indicating a correlation between a slip and a log;

FIG. 16 is a diagram illustrating an example of a slip sent from the company A to a company C;

FIGS. 17(A) and 17(B) are examples of tables which show a correlation between a parent slip with child slips;

FIG. 18 is a diagram showing an example of a slip forwarded within the company C appearing in FIG. 12;

FIG. 19 is a diagram showing an example of a slip sent from the company C to a company B, appearing in FIG. 12;

FIG. 24(A) is a diagram showing an example of a table indicating correlations between slip logs and access check keys;

FIG. 24(B) is a diagram showing an example of a table indicating correlations between slips and access check keys;

DESCRIPTION OF THE PREFERRED EMBODIMENTS

A preferred embodiment of the present invention will be described below with reference to accompanying drawings.

Figure 1:
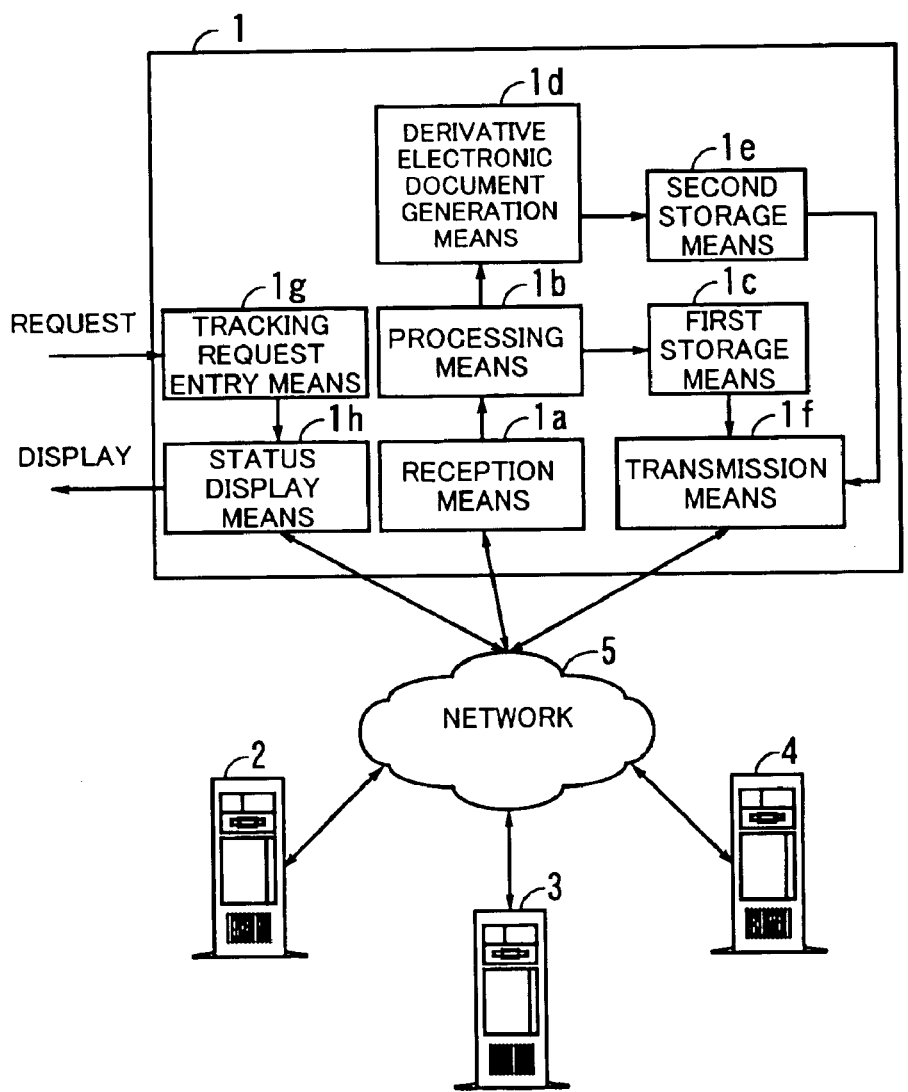
FIG. 1 is a diagram showing the operating principles of the present invention.

FIG. 1 is a diagram showing the operating principles of the present invention. As shown in the figure, the electronic document processing system according to the present invention is comprised of a plurality of electronic document processors 1 to 4, and a network 5.

The electronic document processors 1 to 4 each have the same construction, and therefore, the description will be made here based on the electronic document processor 1, by way of example.

The electronic document processor 1 is comprised of reception means 1a, processing means 1b, first storage means 1c, derivative electronic document generation means 1d, second storage means 1e, transmission means if, tracking request entry means 1g, and status display means 1h.

The reception means 1a receives an electronic document transmitted from any of the other electronic document processors 2 to 4.

The processing means 1b carries out predetermined processing on the electronic document received by the reception means 1a.

The first storage means 1c generates a log of the processing carried out by the processing means 1b, and stores the log in a predetermined resource.

The derivative electronic document generation means 1d generates a derivative electronic document which is a new electronic document derived from the electronic document, according to a result of the processing by the processing means 1b.

When a derivative electronic document is generated by the derivative electronic document generation means 1d, the second storage means 1e stores information indicating the relationship between the electronic document and the derivative electronic document in a predetermined resource.

The transmission means 1f transmits the electronic document processed by the processing means 1b, and the derivative electronic document generated by the derivative electronic document generation means 1d to a next electronic document processor designated.

The tracking request entry means 1g receives a tracking request made by a user for tracking a predetermined electronic document.

When a tracking request for tracking a predetermined electronic document is made via the tracking request entry means 1g, the status display means 1h obtains a log corresponding to the electronic document from the predetermined resource, and displays information indicating a present status of the electronic document.

The network 5 is comprised of a LAN (Local Area Network), an internet, and the like, via which information is transmitted and received between the electronic document processors 1 to 4.

Next, operations of the electronic document processing system shown in FIG. 1 will be described hereinafter.

Figure 2A:
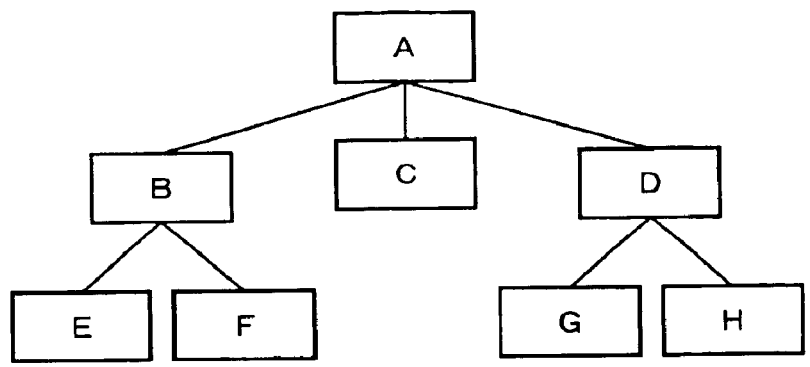
FIG. 2(A) is a diagram showing a completed product A having a hierarchical structure of components.

Now, a case will be considered in which an order is sent for a completed product A which is comprised of groups of components having a hierarchical structure as shown in FIG. 2(A). Here, the completed product A is comprised of components B, C, and D, and the components B and D are comprised of respective groups of components E, F, and components G, H. Accordingly, when an order is sent for the completed product A, order slips are derived from the order and issued for ordering the components B, C, D. Further, from these order slips, order slips are derived and issued for ordering the components E, F, and G, H.

Now, let it be assumed that the electronic document processor 2 is arranged in a company which produces the completed product A, and the electronic document processors 1, 3, 4 are arranged in companies which produce the components B to D, respectively.

In this state, if an order for the completed product A is placed with the electronic document processor 2, the processor 2 creates and sends out order slips to the electronic document processors 1, 3, 4 which correspond to the respective components B to D composing the completed product A. At this time, the electronic document processor 2 generates a log indicating the transmissions of the order slips and stores the log in a predetermined resource (electronic document processor 4, for instance).

In the electronic document processor 1 to which one of the order slips is sent as above, the reception means 1a receives the order slip to supply the same to the processing means 1b.

The processing means 1b carries out processing for adding information e.g. of the time and date when the slip was received, to the slip. Further, to manufacture the component B, it is required to send out orders for the components E, F, so that the processing means 1b instructs the derivative electronic document generation means 1d to create subsidiary or child slips.

As a result, the derivative electronic document generation means 1d creates the child slips as derivative documents, and transmits them to electronic document processors, not shown, corresponding to the components E, F via the second storage means 1e and the transmission means 1f.

Further, when the derivative electronic documents are generated, the second storage means 1e stores information for correlating the original slip (hereinafter referred to as the "parent slip") with the newly derived slips (hereinafter referred to as the "child slips") in a predetermined resource (electronic document processor 4, for instance). Consequently, information correlating the slip corresponding to the component B with the slips corresponding to the respective components E, F is stored in the predetermined resource.

It should be noted that status information of each component is additionally stored in the predetermined resource since an in-process status of the component is input to a corresponding log stored in the predetermined resource e.g. by a person in charge of a manufacturing process of the component.

Since the above-mentioned processing is carried out on each of the other components, logs containing information indicative of parent-child relationship between slips, and information of processing performed on each slip, and in-process information in each process are stored in the predetermined resource.

In the state described above, for instance, if a person in charge of the electronic document processor 2, who sent out the orders, makes a request for tracking of an order slip, the request is input via the tracking request entry means 1g, and supplied to the status display means 1h. The status display means 1h obtains a log of the designated slip stored in the predetermined resource as well as logs of other slips each having a parent-child relationship with the designated slip with reference to information correlating the parent slip with the child slips.

More specifically, when the completed product A is tracked, logs corresponding to the order slips for the components B, C, D are first obtained, and then with reference to the information correlating the parent slip with the child slips, logs of the components E, F, G, H are obtained as information hierarchically immediately under the logs of the components B, C, D. Further, it is possible to acquire information of the in-process status of each component by referring to details of the logs.

Figure 2B:
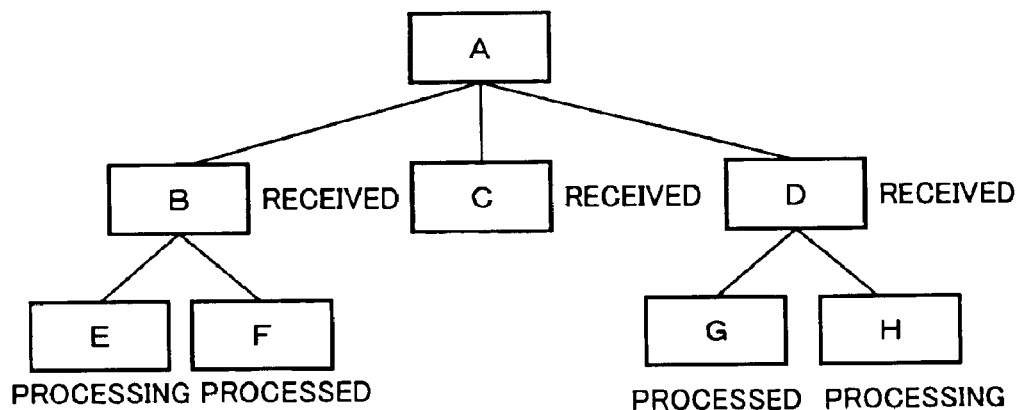
FIG. 2(B) is a diagram showing an in-process status displayed by an electronic document processor according to the present invention.

The information thus obtained is displayed e.g. as shown in FIG. 2(B) by the status display means 1h.

As described hereinabove, according to the document processing system of the invention, a log of each electronic document, and information indicating parent-child relationship between electronic documents are stored in a predetermined resource, so that even when derivative electronic documents are generated, all the electronic documents can be collectively searched for tracking, in a manner of centralized control.

Further, since each log also stores a status of processing on components associated therewith, the processing status of each component can be easily known.

Next, an embodiment of the invention will be described with reference to FIG. 3.

Figure 3:
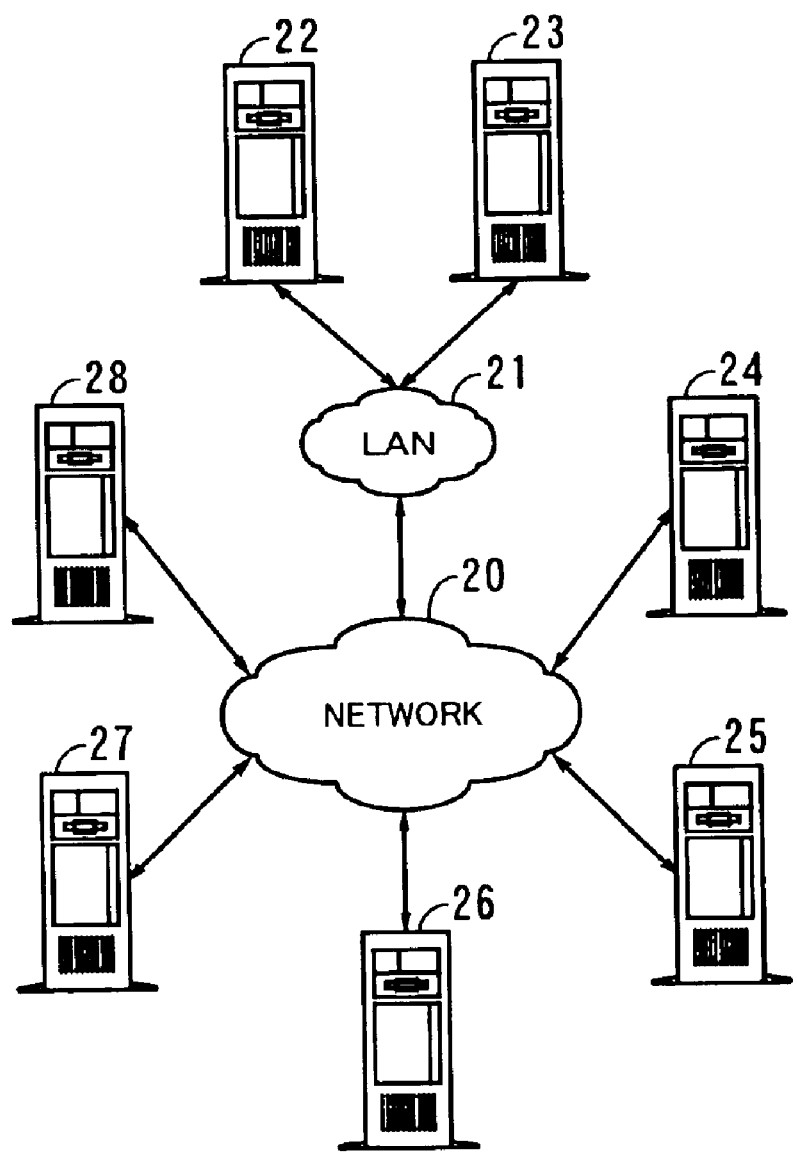
FIG. 3 is a diagram showing an example of the arrangement of an electronic document processing system according to an embodiment of the invention.

FIG. 3 shows an example of the arrangement of an electronic document processing system according to the embodiment of the invention. As shown in the figure, the electronic document processing system is comprised of a network 20, a LAN (Local Area Network) 21, and electronic document processors 22 to 28.

Figure 4:
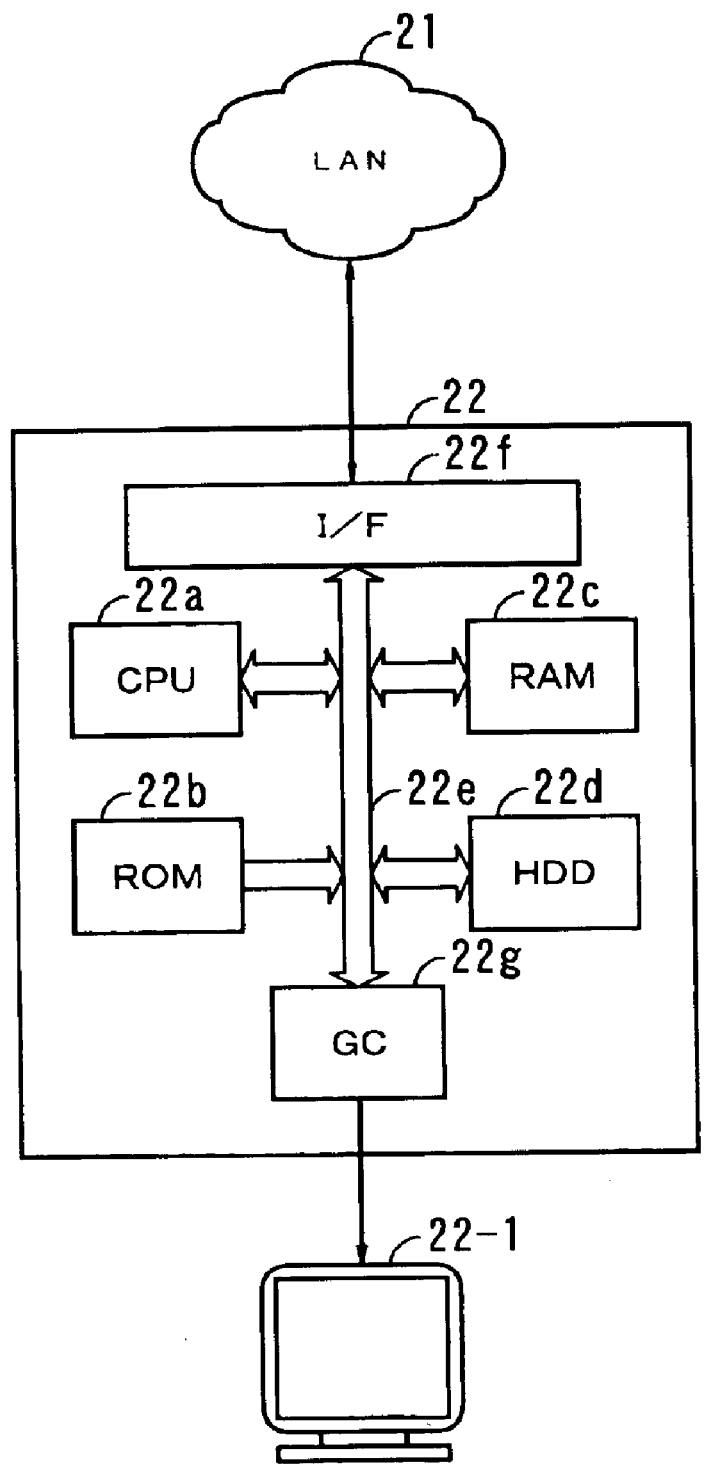
FIG. 4 is a diagram showing an example of the detailed construction of an electronic document processor appearing in FIG. 3.

FIG. 4 illustrates an example of the detailed construction of the electronic document processor 22. As shown in the figure, the electronic document processor 22 is comprised of a CPU (Central Processing Unit) 22a, a ROM (Read Only Memory) 22b, a RAM (Random Access Memory) 22c, an HDD (Hard Disk Drive) 22d, a bus 22e, an I/F (Interface) 22f, and a GC (Graphics Card) 22g. It should be noted that the electronic document processors 23 to 28 also have the same configuration as that of the electronic document processor 22, and hence descriptions thereof will be omitted.

Here, the CPU 22a controls operations of blocks or component devices of the processor according to programs stored in the HDD 22d, and performs various arithmetic operations.

The ROM 22b stores basic programs carried out by the CPU 22a, data therefor, etc.

The RAM 22c temporarily stores a program being executed by the CPU 22a, and data processed thereby.

The HDD 22d stores application programs executed by the CPU 22a, and data processed thereby, and at the same time stores documents and the like received from the other electronic document processors.

The bus 22e connects the CPU 22a, the ROM 22b, the RAM 22c, the HDD 22d, the I/F 22f, and the GC 22g to each other, thereby enabling data to be transmitted and received therebetween.

The I/F 22f executes data format conversion and protocol conversion when information is transmitted and received via the LAN 21 (or network 20).

The GC 22g renders images according to image-rendering instructions supplied from the CPU 22a, and converts image data thus obtained into video signals to send the same to a display device 22-1.

The display device 22-1 is implemented e.g. by a CRT (Cathode Ray Tube) monitor, and displays an image based on the video signals output from the electronic document processor 22.

Figure 5:
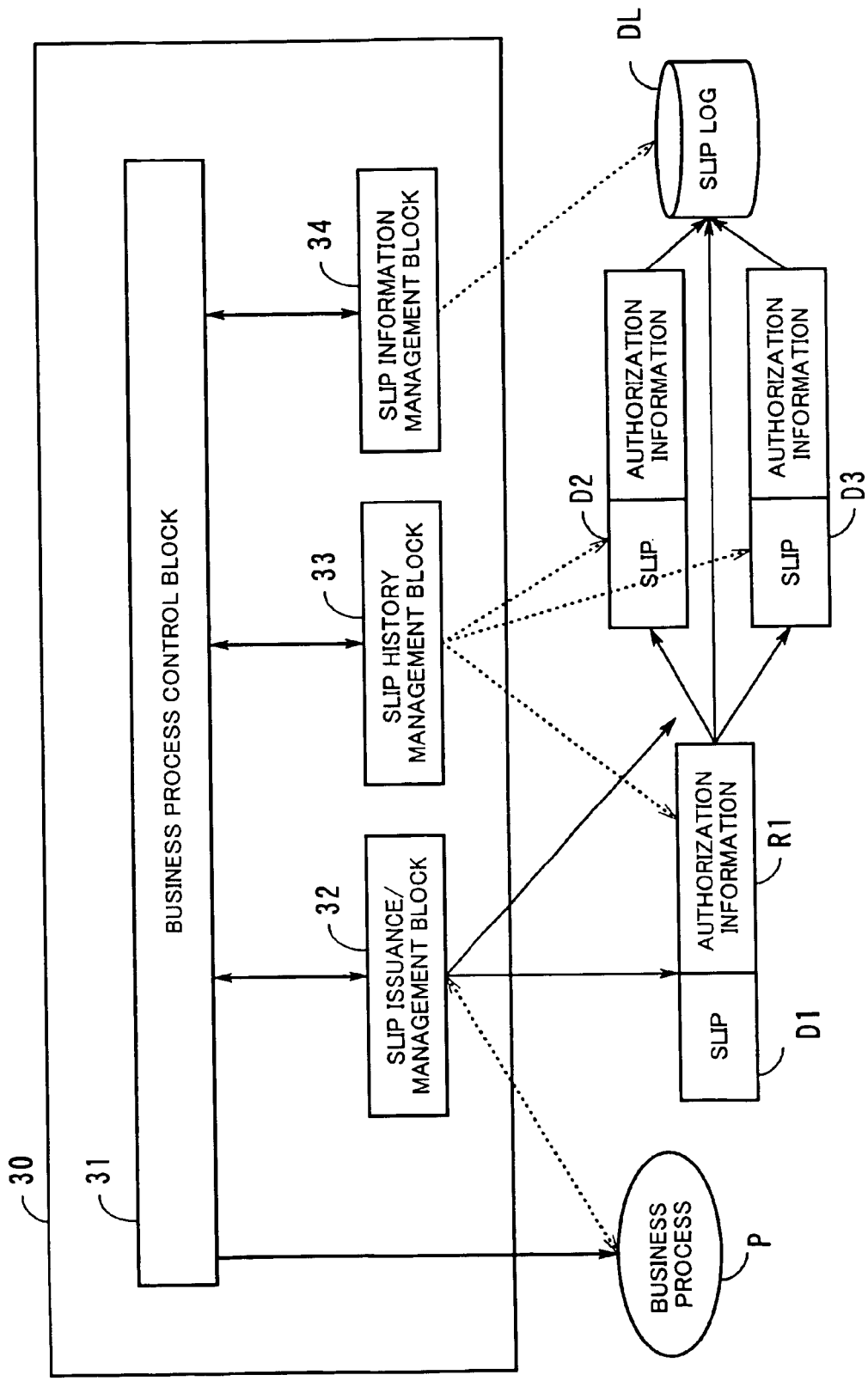
FIG. 5 is a diagram showing an example of a function block which is produced when a predetermined program is carried out by the FIG. 4 electronic document processor.

FIG. 5 is a block diagram showing a block (function block) of functions of the electronic document processor 22, which is realized when a predetermined program stored in the HDD 22d of the processor 22 shown in FIG. 4 is executed. As shown in the figure, the function block 30 realized by the present embodiment is comprised of a business process control block 31, a slip issuance/management block 32, a slip history management block 33, and a slip information management block 34.

Now, the business process control block 31 selects and executes business processes P corresponding to a received slip with reference to a processing rule (process flow) defined in advance according to the kind of a slip. It should be noted that the term "business processes" are used to mean a sequence of processes started upon reception of a slip by a company or a department in a company. It is assumed here that the business processes include not only processes carried out within the electronic document processor but also processes (e.g. process for manufacturing a product) executed outside the processor. Further, the term "process flow" is used to define a flow of business processes generated by the company or the department, starting from generation of a slip and ending in the delivery of a product. The process flow defines, for instance, an order of execution, executing conditions, times of execution, etc. of the business processes.

The slip issuance/management block 32 operates when a new slip is issued, and correlates the identifier of an issuer of the slip with the slip issued. Further, when a child slip is issued, the child slip is correlated with its parent slip.

The slip history management block 33 manages logs DL (hereinafter referred to as "slip logs" as required) of slips generated by business processes P, and puts them in order such that they can be retrieved. Here, a slip log is information concerning processing, which is generated when a business process P is carried out.

The slip information management block 34 manages and limits access to slip logs DL. More specifically, the slip information management block 34 compares rights of a user who has made a request for access to a slip log DL, with authorization information added to the slip log DL to which the user made the request for access, and presents only a portion of the slip log DL, disclosure of which can be permitted.

Next, the detailed construction of each block of the FIG. 5 function block will be described with reference to FIGS. 6 to 9.

Figure 6:
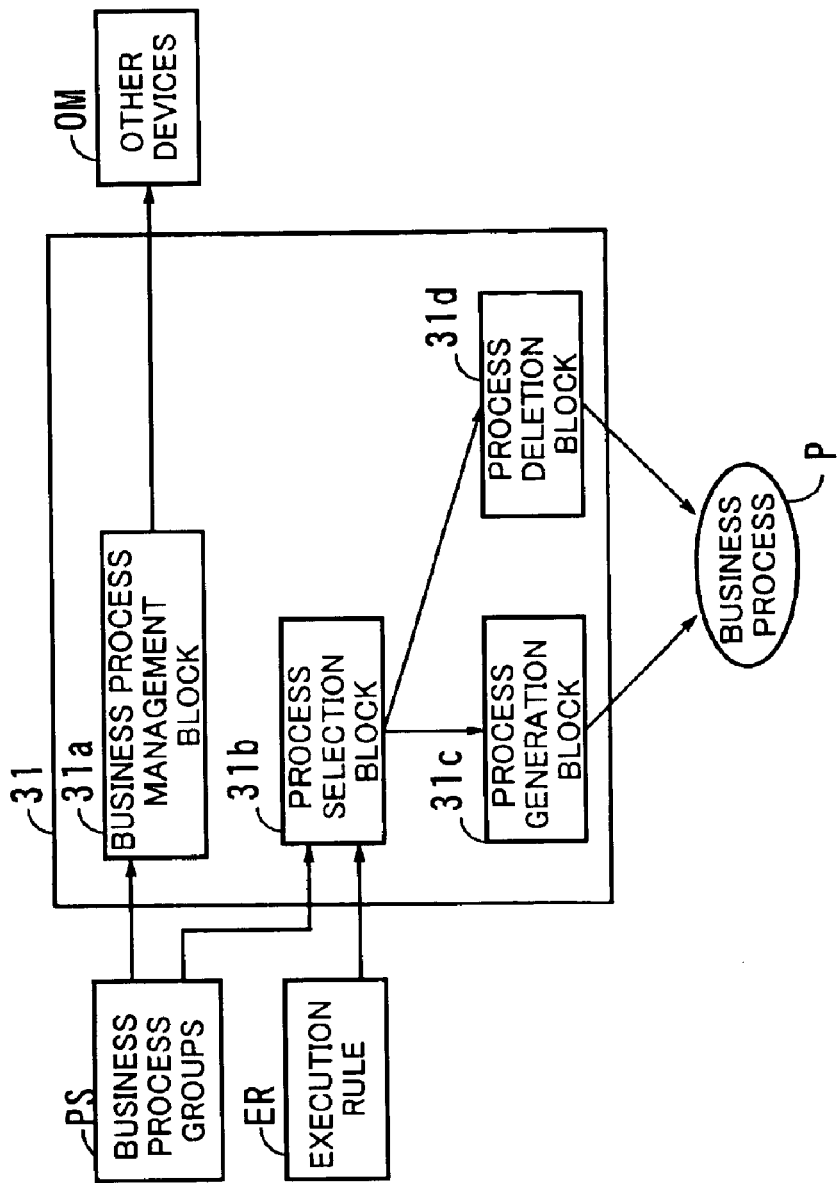
FIG. 6 is a diagram illustrating an example of the detailed construction of a business process control block appearing in FIG. 5.

FIG. 6 illustrates an example of the detailed construction of the business process control block 31. As shown in the figure, the business process control block 31 is comprised of a business process management block 31a, a process selection block 31b, a process generation block 31c, and a process deletion block 31d.

The business process management block 31a manages all the business process groups PS executed by the system, and controls other devices OM.

The process selection block 31b selects a business process according to an execution rule (process flow) ER input.

The process generation block 31c provides the selected business process P with an identifier, and manages the generation of the business process.

The process deletion block 31d monitors the termination of the business process P, and deletes the business process as required.

Figure 7:
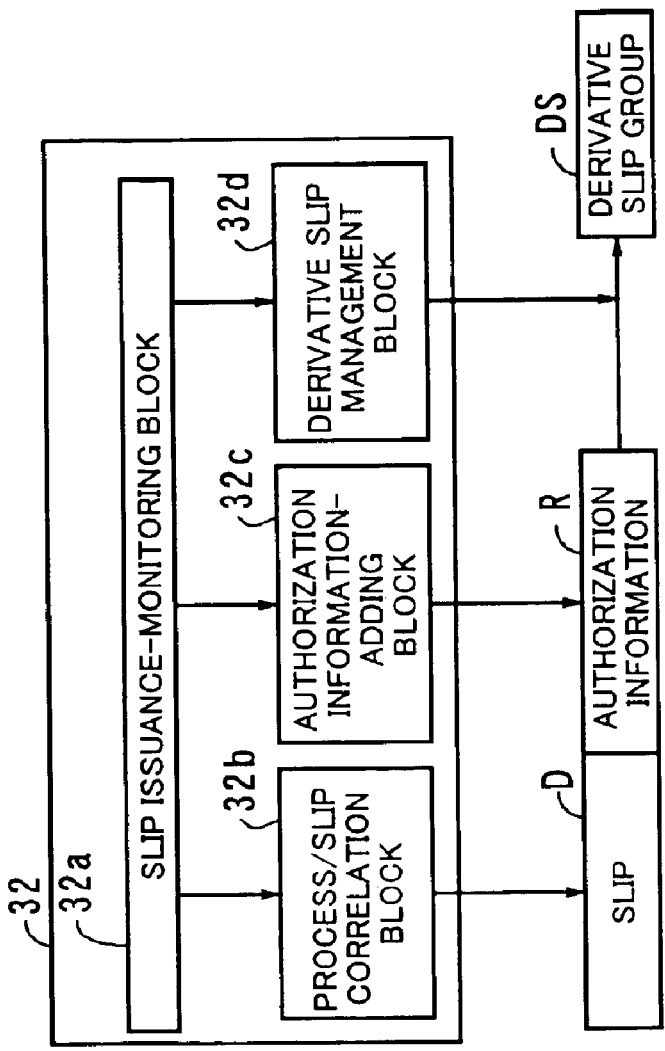
FIG. 7 is a diagram illustrating an example of the detailed construction of a slip issuance/management block appearing in FIG. 5.

FIG. 7 illustrates an example of the detailed construction of the slip issuance/management block 32. As shown in the figure, the slip issuance/management block 32 is comprised of a slip issuance-monitoring block 32a, a process/slip correlation block 32b, an authorization information-adding block 32c, and a derivative slip management block 32d.

The slip issuance-monitoring block 32a monitors a slip D issued by a business process P.

The process/slip correlation block 32b correlates the issued slip D with the business process P.

The authorization information-adding block 32c adds authorization information R to the slip D.

The derivative slip management block 32d manages correlations between derivative slips and the original slip.

Figure 8:
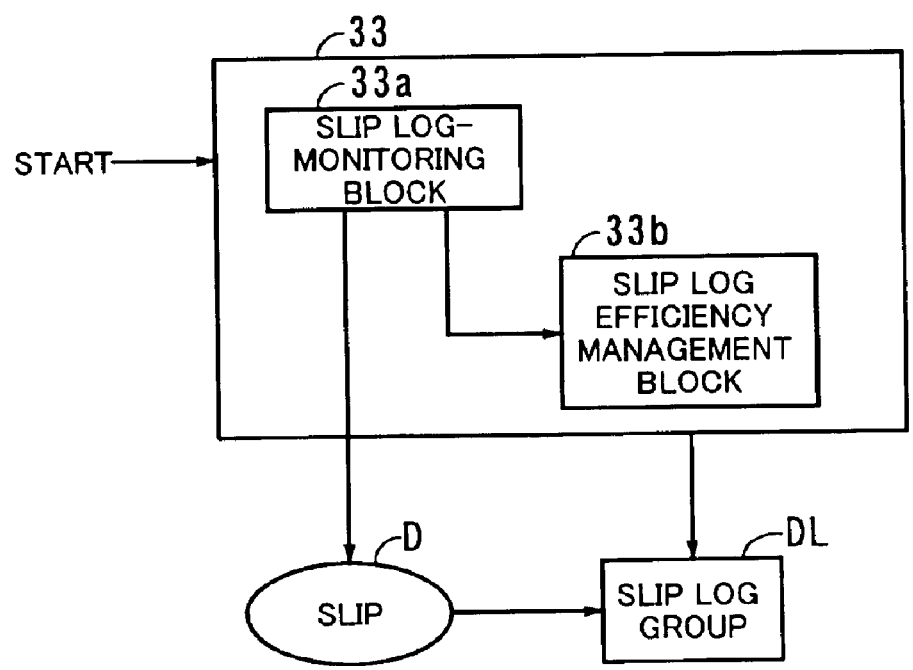
FIG. 8 is a diagram illustrating an example of the detailed construction of a slip history management block appearing in FIG. 5.

FIG. 8 illustrates an example of the detailed construction of the slip history management block 33. As shown in the figure, the slip history management block 33 is comprised of a slip log-monitoring block 33a, and a slip log efficiency management block 33b.

The slip log-monitoring block 33a monitors the generation of slips D.

The slip log efficiency management block 33b manages slip log groups DL generated by the slip log-monitoring block 33a such that the slip logs can be retrieved with ease.

Figure 9:
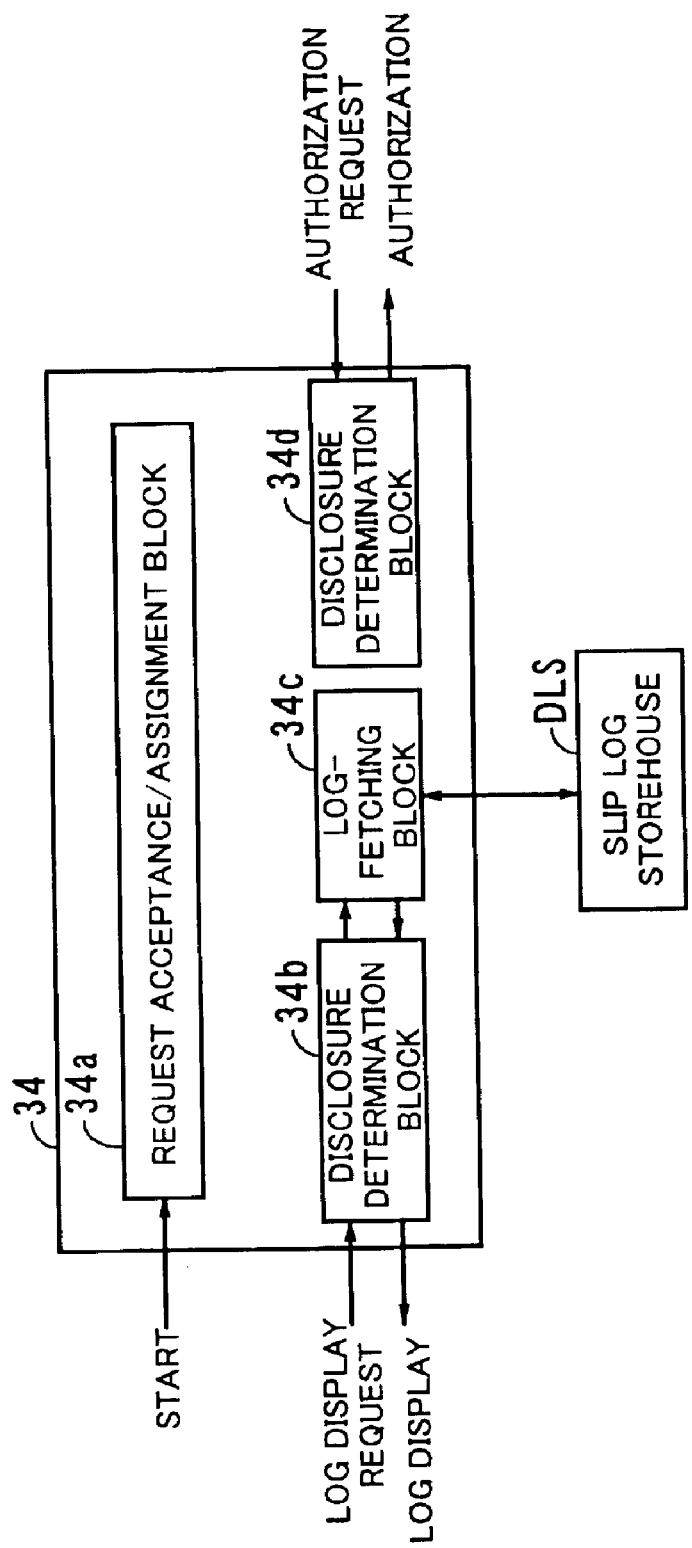
FIG. 9 is a diagram illustrating an example of the detailed construction of a slip information management block appearing in FIG. 5.

FIG. 9 illustrates an example of the detailed construction of the slip information management block 34. As shown in the figure, the slip information management block 34 is comprised of a request acceptance/assignment block 34a, a disclosure determination block 34b, a log-fetching block 34c, and a disclosure determination block 34d.

The request acceptance/assignment block 34a accepts a request, and assigns the request to an appropriate function block.

The disclosure determination block 34b compares the rights of a user with authorization information added to a log when the user is making a request of access to the log, and presents the log to the user if the access of the user can be permitted.

The log-fetching block 34c selects and obtains a designated log from a slip log storage DLS.

When an authorization request is made by a user, the disclosure determination block 34d makes a judgment on the details of the request, and authorizes the user according to the judgment.

Figure 10:
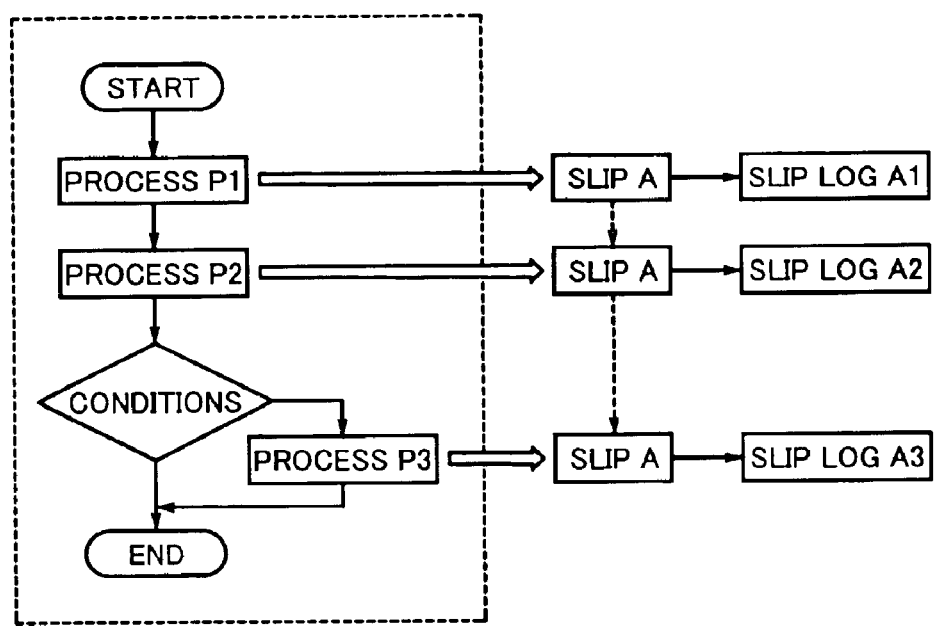
FIG. 10 is a diagram showing the relationships between processes, slips, and slip logs, generated by the present embodiment.

FIG. 10 shows the relationship between business processes (hereinafter each referred to as a "process" as required), a process flow, a slip, and slip logs, as found in the present embodiment.

As shown in the figure, a process flow is comprised of a plurality of processes P1 to P3. The process flow is defined on a slip-by-slip basis to determine a flow of a sequence of processes carried out on the slip. In this figure, a flow of a sequence of processes carried out on a slip A is illustrated by way of example.

The processes are executed for the slip A. It should be noted that results of the respective processes are recorded as slip logs A1 to A3.

Figure 11:
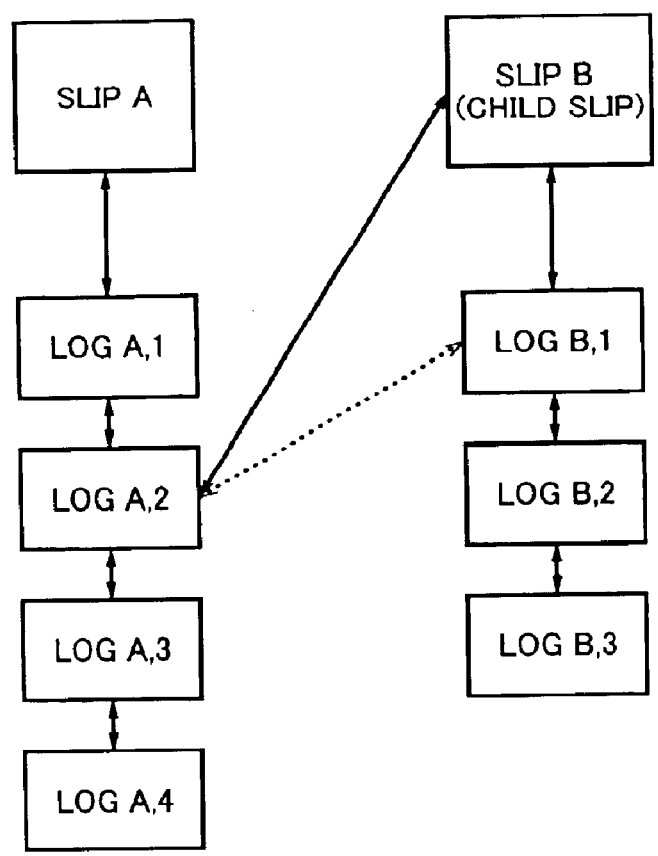
FIG. 11 is a diagram which is useful in explaining the relationship between a slip, a child slip, and logs, generated by the present embodiment.

FIG. 11 is a diagram which is useful in explaining a parent-child relationship between slips generated according to the invention. In the illustrated example, a log A,1 to a log A,4 are generated according to processes carried out on the slip A. When the log A,2 is generated, a slip B which is a child slip is produced. For the slip B, a log B,1 to a log B,3 are generated.

Next, operations of the electronic document processing system according to the embodiment will be described. The following description is made, by way of example, referring to slips transmitted and received between companies having a relationship as found in FIG. 12.

Figure 12:
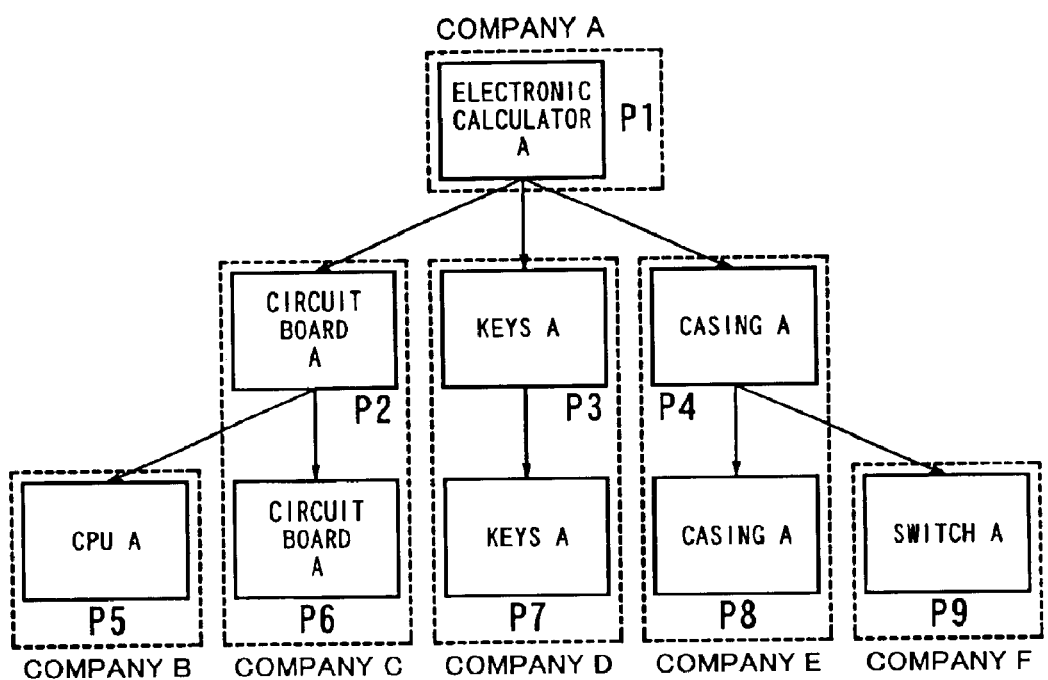
FIG. 12 is a diagram showing the relationship between companies and slips transmitted and received between them, in the case where a company A which manufactures an electronic calculator places orders for components of the calculator with other companies.

FIG. 12 is a diagram useful in explaining a relationship between the companies and the slips, as found when a company A which manufactures an electronic calculator sends out orders for components of the calculator to other companies.

In the above figure, rectangular boxes shown by solid lines indicate predetermined companies and predetermined departments of companies, and letters inside the rectangular boxes indicate components (and a completed product) manufactured by the companies and the departments. Reference numerals P1 to P9 set forth outside the respective solid-line rectangular boxes designate the process IDs of processes carried out by the companies and the departments. Further, solid-line rectangular boxes within each rectangular box shown by dotted lines show that departments indicated by the solid-line rectangular boxes belong to an identical company indicated by the dotted-line rectangular box.

In the illustrated example, when producing an electronic calculator A, first, the company A sends out order slips to companies C, D, E which fabricate a circuit board A, a set of keys A, and a casing A, respectively. The company C fabricates the circuit board A within a predetermined department thereof, and at the same time places an order for a CPU A to be mounted on the circuit board A with a company B. The company D fabricates the ordered keys A in a predetermined department thereof. Further, the company E fabricates the ordered casing A in a predetermined department thereof, and at the same time places an order for a switch A attached to the casing A with a company F.

Now, let it be assumed that a predetermined user has ordered five thousand electronic calculators A from the company A. Then, an order clerk in the company A operates an electronic document processor (FIG. 3 electronic document processor 24, for instance) of his company to display an order slip entry screen as shown in FIG. 13 on the display device 22-1.

In the above example, a window 60 with the heading of "ORDER SLIP" is displayed, and at an upper right portion of the window 60 are displayed buttons 60a to 60c which are operated respectively for reducing and increasing the size of the window 60, and closing the window 60.

Within a display area of the window 60, there are displayed a slip number 60d which is a unique number automatically assigned to the order slip, a text box 60e for inputting a product name, a text box 60f for inputting an orderer's name, a text box 60g for inputting the quantity of products, a text box 60h for inputting a delivery date, an order button 60i which is operated for sending out an order accordance to entries, and a cancel button 60j which is operated for canceling the entries.

Figure 13:
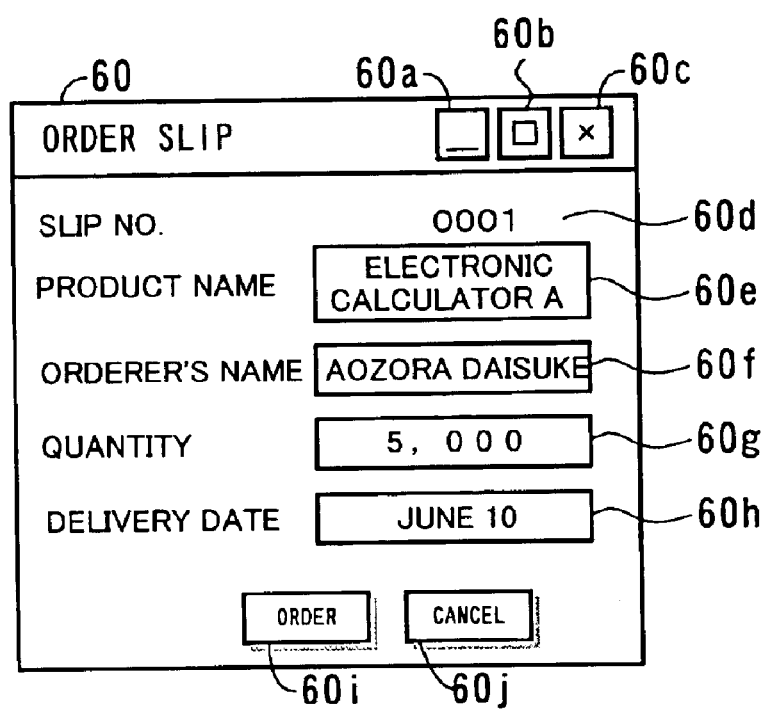
FIG. 13 is a diagram illustrating an example of an order slip entry screen.

In the window 60 configured as above, if the order button 60i is operated after entries shown in FIG. 13 have been made, the slip issuance/management block 32 of the electronic document processor issues a slip corresponding to the entries.

FIG. 14 shows an example of a slip generated at this time. In this example, a slip having the same contents as shown on the FIG. 13 order slip screen is produced. To the slip generated as above, the slip issuance/management block 32 adds authorization information for limiting access of users thereto.

The slip history management block 33 produces a log of the newly generated slip, and stores the log in a storage device of its own, for instance. Further, the slip history management block 33 records the newly generated log and information indicative of a location storing the log in a log management table which correlates the log with the location of storage of the log. It should be noted that contents of a slip can be copied to a log of the slip without further processing.

FIG. 15 illustrates an example of the log management table. The log management table stores therein a slip log ID, a process ID, an internal-process serial number, and a slip log storage location. Here, the slip log ID is a unique identification number assigned to each slip. The process ID is an identification number of a process in which a log has been generated. The internal-process serial number is information for discriminating a second process and processes subsequent thereto when the same slip is circulated twice or more times. The slip log storage location is information indicating a location where the log is stored, and formed e.g. by an IP (Internet Protocol) address. By looking up the table described above, it is possible to locate where a log correlated with a desired slip is stored. Further, a log management table of the above-mentioned kind is produced on a slip-by-slip basis, and stored in a predetermined location (hereinafter referred to as a "storehouse") set on the network.

Next, the business process control block 31 of the electronic document processor carries out a next process according to a process flow defined for a generated slip. In the case of the illustrated example of the slip, it is required, as shown in FIG. 12, to place orders for components with the companies C, D, E, respectively. This is defined in the process flow, and accordingly, the business process control block 31 generates new slips and sends them to the companies C, D, E, respectively.

FIG. 16 illustrates an example of a slip sent from the company A to the company C. In this example, a slip number is 0001-1, and a product name is CIRCUIT BOARD A. Further, the delivery date is set to JUNE 5 in view of a time period required for assembling supplied components within the company A.

Since the slip generated as above corresponds to a child slip of the preceding slip produced in advance, the slip issuance/management block 32 generates information for correlating the parent slip with the child slip, and stores the information in the storehouse mentioned above.

FIGS. 17(A) and 17(B) show examples of information for correlating a parent slip with child slips. FIG. 17(A) shows information concerning the slip shown in FIG. 14. The illustrated examples shows that there are three kinds of slips having respective slip numbers of 0001-1, 0001-2, and 0001-3, as child slips of the FIG. 14 slip, and these slip were issued in the process P1 (see FIG. 12). Further, such information indicating a parent-child relationship is also generated for each of the child slips. FIG. 17(B) shows information concerning the child slip whose slip number is 0001-1. This example shows that the parent slip has a slip number of 0001, and the process which issued the form is P1.

The slip history management block 33 generates and stores a log of each child slip as well as produces a log management table for management of the logs to store the same in the log storehouse.

Then, the companies C, D, E which have received the respective slips each forward the slip to related departments of their own, and at the same time generate new slips as required to send them to their affiliate companies. In the FIG. 12 example, the company C generates a new child slip and sends out the same to the company B while forwarding the received slip to a corresponding department within the company C.

FIG. 18 shows an example of a slip forwarded in the company C. In this example, the name of a person in charge is added to the FIG. 16 slip together with a stamp of the date and time the order was received. It should be noted that if new information is added to a slip, as in the case described hereinabove, a log is generated and stored, and items corresponding to the new log are added to a log management table an example of which is shown in FIG. 15.

FIG. 19 shows an example of a slip transmitted from the company C to the company B. In this example, a slip number is 0001-1-1, and a product name is CPU A. Further, an order company is ○X Parts, an orderer's name is NAGAI SOUICHIROU, and a delivery date is set to JUNE 1. The other items are the same as in the case of FIG. 16.

The company B and the predetermine department of the company C, who have received the above slips, start manufacturing ordered components. At this time, similarly to the case described above, logs are generated and stored when the slips are received.

Now, in a component-manufacturing process, information ("PROCESSING" or "50% COMPLETED", for instance) indicative of an in-process status is added to a log. That is, a company's management department for managing delivery keeps tack of a delivery status and an in-process status, so that such information is sequentially written in the log e.g. by manual operations.

It should be noted that processes of the above-mentioned kind are also carried out by the companies D, E, whereby fabrication of ordered components is started, and in-process statuses of components are added to corresponding logs.

In summary, first, when a slip was issued, logs are generated and registered with (stored in) electronic document processors in respective companies, and a log management table for managing log's locations is produced on a slip-by-slip basis and stored at a predetermined location on the network 20. When a business process is carried out on the slip, a log indicative of the details of the process and results of the same is generated and stored, and at the same time, information of the new log is added to the log management table. Further, after the slip has been received, information indicative of an in-process status of the slip is also added to the log.

According to the prior art, if derivative slips (child slips) exist, it has been impossible to track the child slips, as described hereinabove. In contrast, according to the present embodiment, it is possible to track all slips including the child slips, and check on the progress of each business process. In the following, tracking of slips carried out by the present embodiment will be described.

Figure 20:
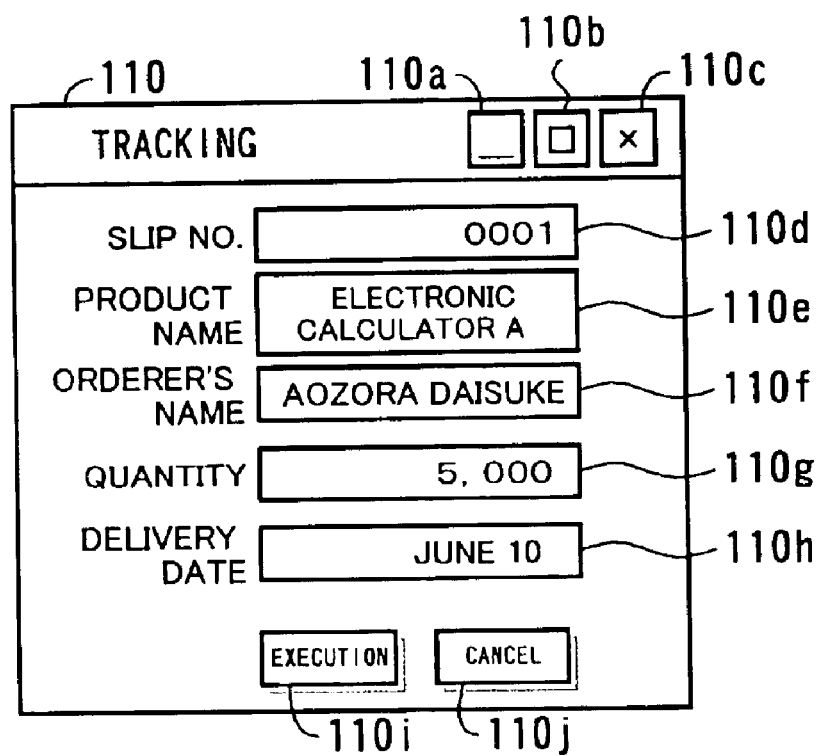
FIG. 20 is a diagram illustrating an example of a tracking screen.

When a person in charge in the company A, for instance, is to check on an in-process status of the electronic calculators A, first, the person causes his electronic document processor to display a screen as shown in FIG. 20 to effect entries of required items. In this screen, a window 110 with the heading of "TRACKING" is displayed. On a display area of the window 110, there are displayed text boxes 110d to 110h for inputting a slip number, a product name, an orderer's name, a quantity, and a delivery date. Further, at a lower end of the display area are displayed an execution button 110i, and a cancel button 110j which are operated when tracking is carried out.

In the window 110 configured as above, after the items as shown in FIG. 20 have been entered, when the execution button 110i is operated, the slip information management block 34 obtains a log management table (see FIG. 15) which corresponds to a slip having a slip number of 0001, from the storehouse, and identifies a list of logs belonging to the slip and a log storage location therefor. Further, with reference to the information indicating the parent-child relationship between the slips, examples of which are shown in FIGS. 17(A) and 17(B), the slip information management block 34 identifies child slips derived from the parent slip and groups of slips further derived from the child slips, and locate the logs, from log management tables corresponding to the respective slips.

After locating all the related logs, the slip information management block 34 collects information stored or recorded in the logs. Further, at this time, the slip information management block 34 obtains a process flow corresponding to the slip.

Figure 21:
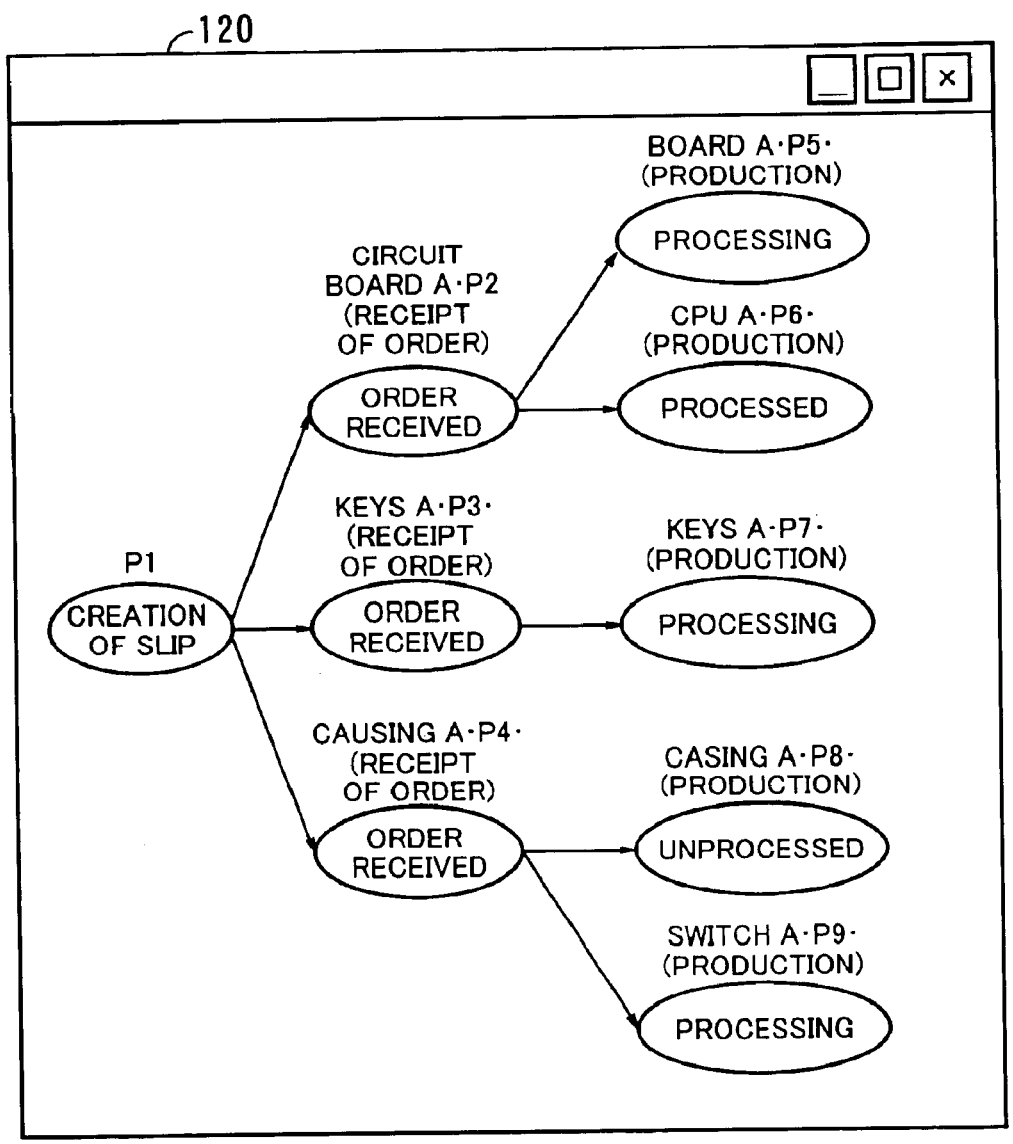
FIG. 21 is a diagram illustrating an example of a screen which is displayed when an execution button is operated after predetermined entry items have been input on the FIG. 20 tracking screen.

By consulting the process flow, the slip information management block 34 arranges pieces of the information obtained from the logs, as required, to display the information on the display device 22-1. FIG. 21 shows an example of a screen displayed on the display device 22-1 at this time. In the illustrated example, ellipses and a circle indicate business processes. Arrowed straight lines connecting the ellipses and the circle to each other designate the relationship between the business processes. Further, inside the ellipses and the circle, the statuses of the business processes are displayed. Furthermore, kinds of the respective business processes are displayed within parentheses on right-hand sides of reference symbols P1 to P9 which designate the respective business processes.

By viewing the screen configured as above, it is possible to obtain an overview of the progress of the whole process. Although this example illustrates a case in which tracking is carried out by a person in charge in the company A, when tracking is carried out by a person other than the person in charge in the company A, it is also possible to change the contents displayed on the screen depending on a rank in the company to which the person belongs, or his rights of access to the log data.

Figure 22:
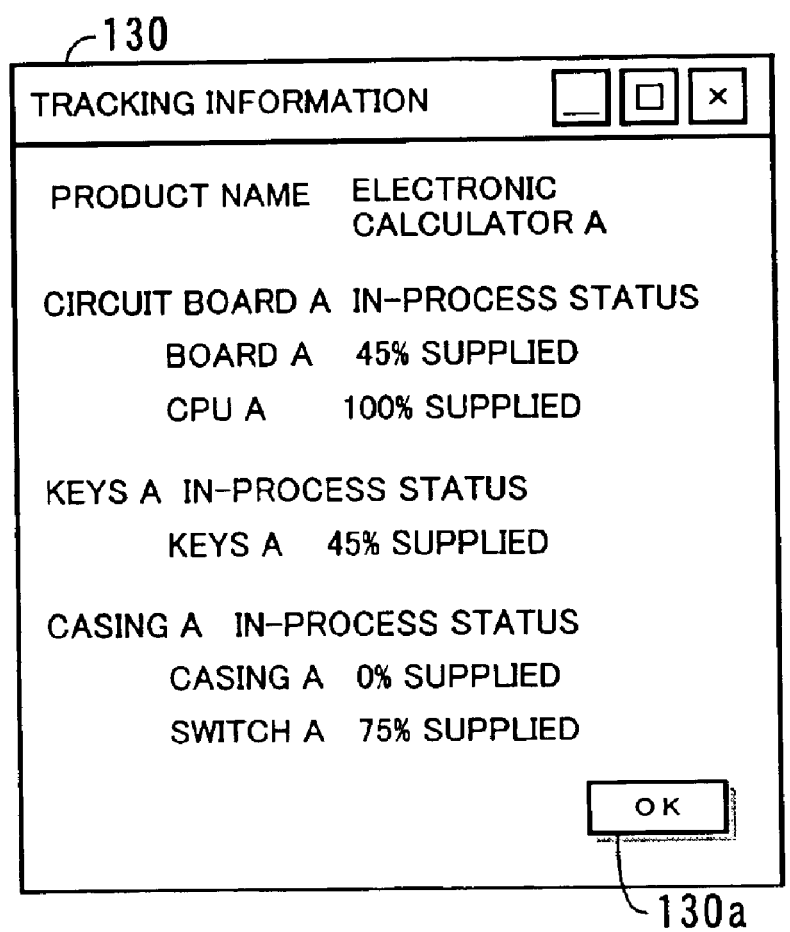
FIG. 22 is a diagram illustrating an example of a screen which is displayed when a user designated a predetermined process on the FIG. 21 screen.

Next, in the FIG. 21 screen, for instance, if "CREATION OF SLIP" corresponding to the process P1 was designated by a pointing device, not shown, or the like, the slip information management block 34 collects information contained in the obtained logs and indicating in-process statuses of all the processes, whereby the progresses of the respective processes hierarchically under the process P1 are displayed in a list as shown in FIG. 22.

In this example, the in-process status of each of the circuit board A, the keys A, and the casing A is displayed. By viewing the screen thus configured, it is possible to obtain detailed information of all the business processes.

Although in the FIG. 22 example, the information of the business processes at all the hierarchical levels is displayed, there can be a case in which disclosure of a particular part of the information can cause some trouble. In such a case, the system may be configured such that the disclosure determination block 34d can compare the obtained log information with the rights of a user requesting the display of information, and based on the comparison, only information which can be permitted to be disclosed is selectively displayed.

Figure 23:
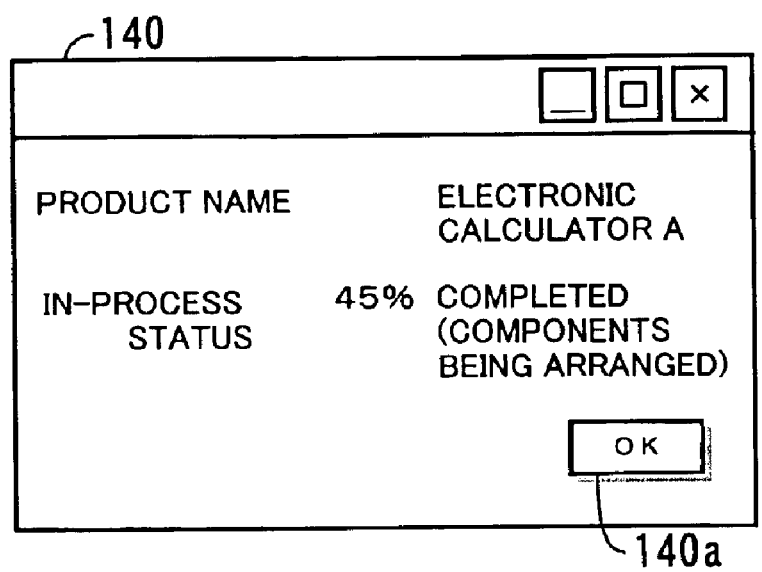
FIG. 23 is a diagram illustrating an example of a screen which is displayed when another user did the same operation as in the case of FIG. 22.

FIG. 23 shows an example of a display screen displaying only information which can be permitted to be disclosed, out of the obtained log information. In the case of the illustrated example, it is assumed that an end user (user who ordered an electronic calculator A) made a tracking request. In this example, only the in-process status of the electronic calculator A is displayed, and information other than the in-process status information is excluded. More specifically, it is not desirable to disclose a status of orders placed by the company A with other companies to ordinary users, so that when a tracking request is made by an ordinary user, only information which can be permitted to be disclosed is selectively displayed. As to the case of FIG. 21 as well, the same processing is carried out to select information for disclosure.

In order to selectively display only information that can be permitted to be disclosed, tables correlating slips with access keys are provided in advance, e.g. as shown in FIGS. 24(A) and 24(B), and through comparison of the access key of a user making the request with each of the access keys of the tables, it is checked whether or not the user is authorized to access the log. Further, as shown in FIG. 24(B), it is also possible to set access check keys for use with each information item included in each log and set information to be disclosed according to an access check key of a user making an access request. In this example, as for general information, no access keys are required since everyone is permitted to access general information. On the other hand, to disclose secret information #1, #2 which should not be disclosed to ordinary users, respective access keys are required, and an access to the log by a user who does not have an access key is refused.

As described above, according to the embodiment of the invention, even when derivative slips are generated, it is possible to grasp the progress of the business process as a whole.

Next, examples of processing carried out by the above embodiment will be described.

Figure 25:
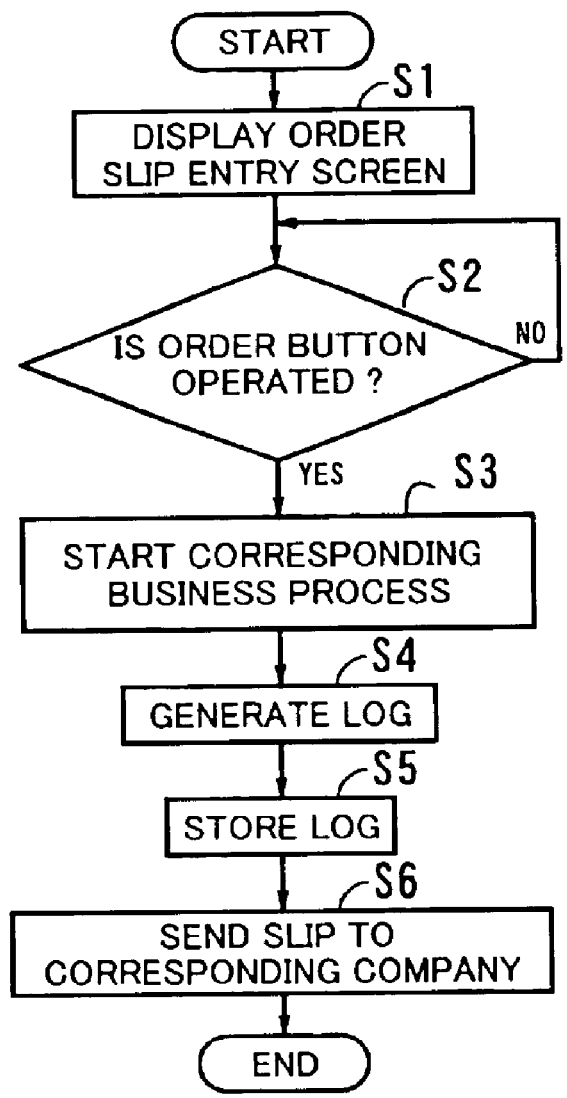
FIG. 25 is a flowchart showing processing steps which are carried out when a new slip is generated.

FIG. 25 shows an example of processing carried out in sending out an order. When this processing is started, the following steps are carried out.

[S1] The slip issuance/management block 32 displays an order slip entry screen, as shown in FIG. 13, and receives entries to the items.

[S2] The slip issuance/management block 32 determines whether or not the order button 60 was operated. If the order button 60i was operated, the program proceeds to a step S3. If not, the same processing is repeatedly carried out.

[S3] The slip issuance/management block 32 identifies a business process corresponding to the order slip based on the entries thereto, and starts the business process.

[S4] The slip issuance/management block 32 controls the slip history management block 33 such that the block 33 generates a log corresponding to the business process.

[S5] The slip issuance/management block 32 controls the slip history management block 33 such that the block 33 stores the generated log in a predetermined location.

[S6] The slip issuance/management block 32 transmits the generated slip to a corresponding company.

The above processing makes it possible to generate a new slip and transmit the same to a corresponding company.

Figure 26:
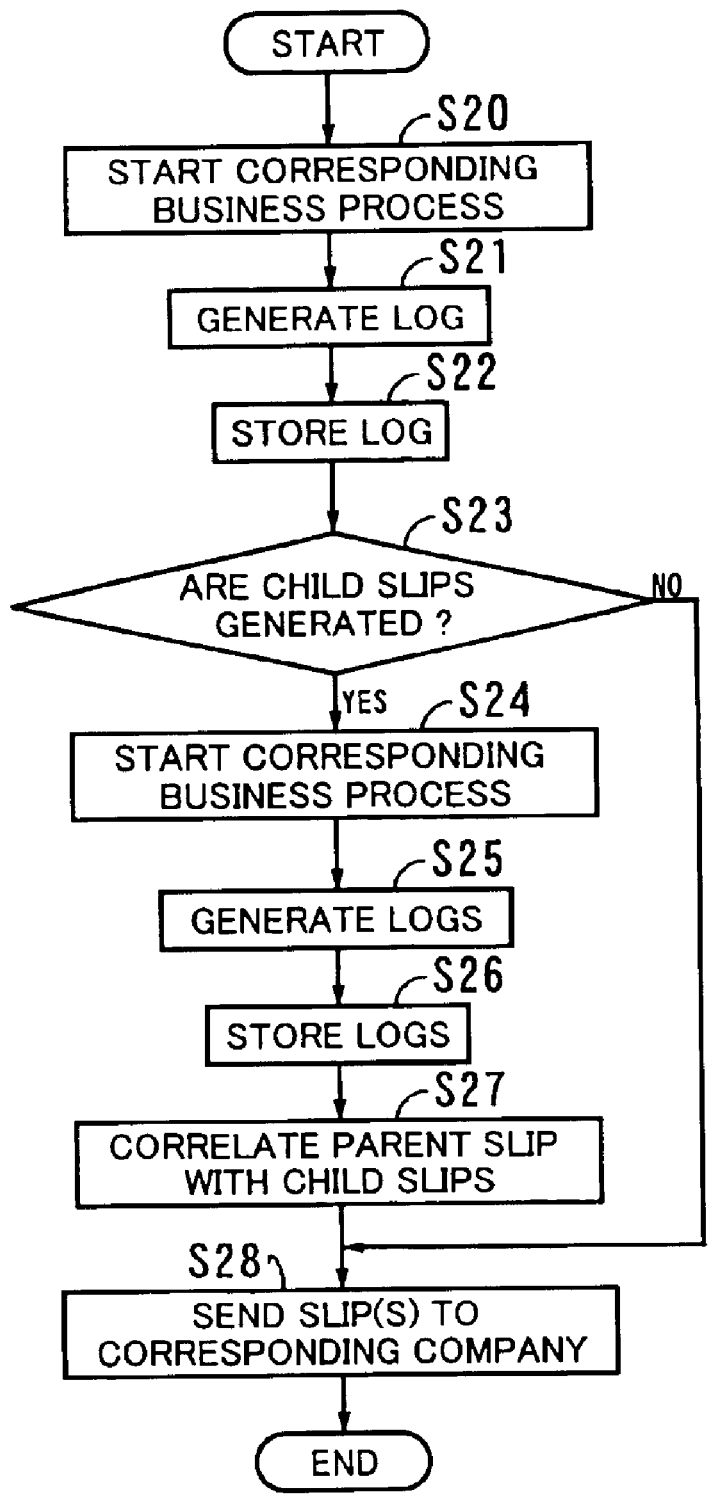
FIG. 26 is a flowchart showing processing steps which are carried out by the electronic document processor when the processor has received a slip.

Next, referring to FIG. 26, an example of processing executed by an electronic document processor which has received a slip will be described.

[S20] The business process control block 31 starts a business process corresponding to the received slip.

[S21] The business process control block 31 controls the slip history management block 33 such that the block 33 generates a log.

[S22] The business process control block 31 controls the slip history management block 33 such that the block 33 stores the generated log in a predetermined location.

[S23] The business process control block 31 determines with reference to a process flow whether or not it is required to produce child slips. If it is required to produce child slips, the program proceeds to a step S24. If not, the program proceeds to a step S28.

[S24] The business process control block 31 starts a corresponding business process.

[S25] The business process control block 31 controls the slip history management block 33 such that the block 33 generates logs for the child slips.

[S26] The business process control block 31 controls the slip history management block 33 such that the block 33 stores the generated logs in the predetermined location.

[S27] The business process control block 31 creates a table indicating a parent-child relationship, an example of which is shown in FIG. 17, and stores the table in a storehouse.

[S28] The business process control block 31 sends the received slip, and the newly generated child slips, if any, to a corresponding company.

The above processing makes it possible to carry out the business process on the received slip according to a predefined process flow, generate child slips as required, correlate necessary information items with each other, and transmit the generated child slips and the received slip to a next company.

Figure 27:
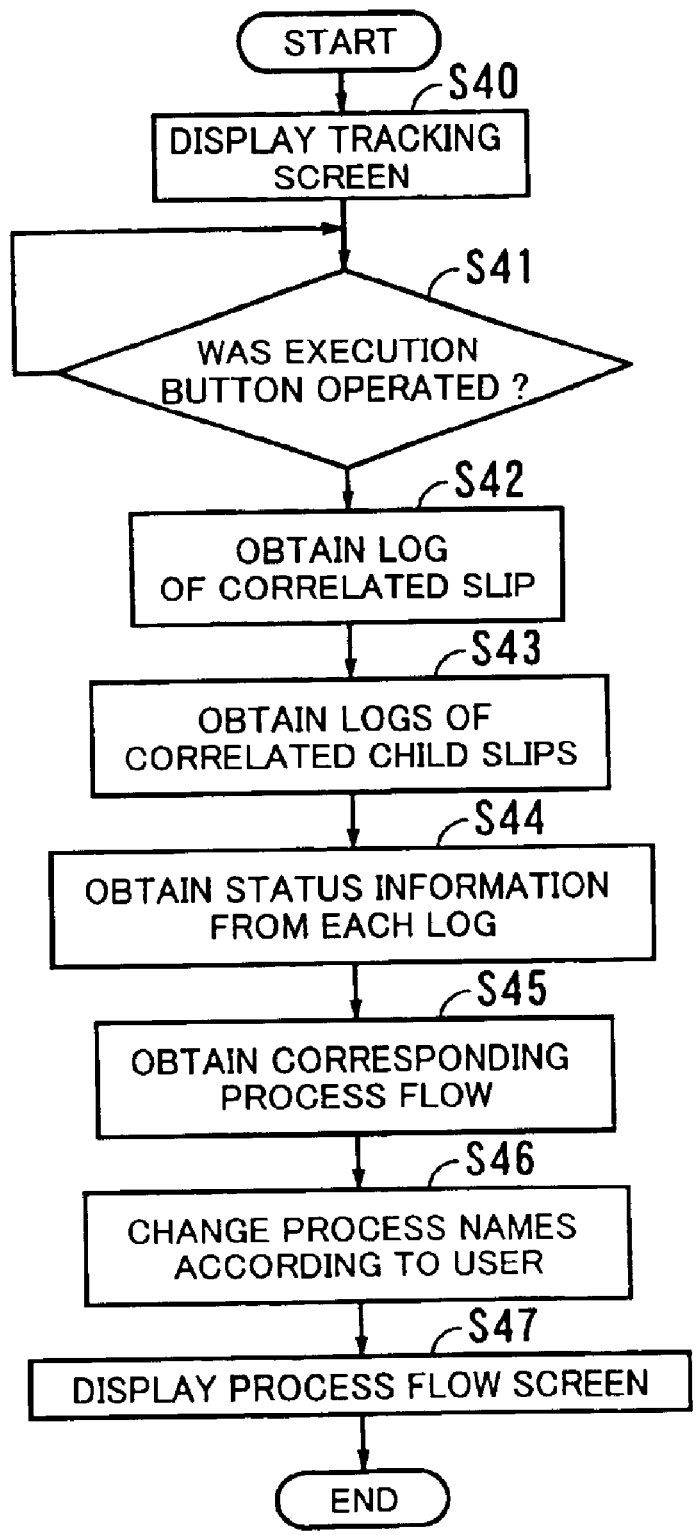
FIG. 27 is a flowchart showing processing steps which are carried out during tracking.

Next, referring to FIG. 27, an example of processing executed during tracking will be described.

[S40] The slip information management block 34 displays a tracking screen as shown in FIG. 20 on the display device 22-1, and receives entries to predetermined items.

[S41] The slip information management block 34 determines whether or not the execution button 110i was operated. If the execution button 110i was operated, the program proceeds to a step S42. If not, the same processing is repeatedly carried out.

[S42] The slip information management block 34 obtains a log of a related slip by looking up a log management table, an example of which is shown in FIG. 15.

[S43] The slip information management block 34 looks up a table indicating a parent-child relationship, an example of which is shown in FIG. 17, and obtains logs of child slips or further descendant slips than the child slips.

[S44] The slip information management block 34 obtains status information from each log.

[S45] The slip information management block 34 obtains a process flow corresponding to a slip designated.

[S46] The slip information management block 34 changes the names of business processes depending on a user.

More specifically, in the illustrated example in FIG. 21, the slip information management block 34 changes the names of business processes displayed in parentheses on the right-hand sides of the processes P1 to P9, depending on a user. For instance, the name of "Components Production" denoted for an end user (consumer) is changed to the name of "Components Arrangement" when denoted for a maker.

[S47] The slip information management block 34 displays a process flow screen, an example of which is shown in FIG. 21, on the display device 22-1.

The above processing makes it possible to display a process flow screen as shown in FIG. 21 on the display device 22-1.

Figure 28:
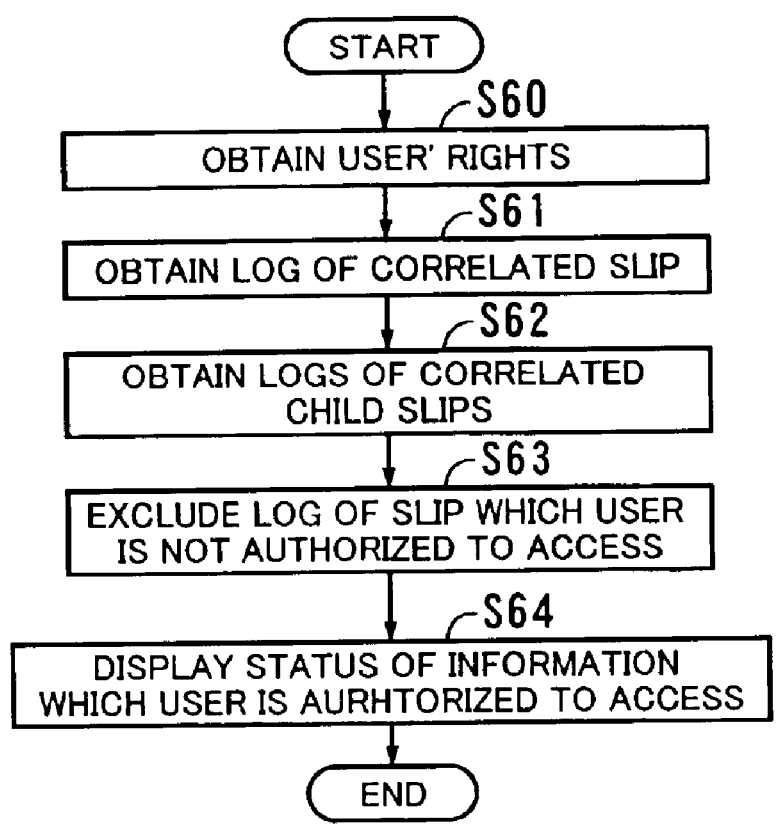
FIG. 28 is a flowchart showing processing steps which are carried out when a predetermined process is designated on the FIG. 21 display screen.

Next, referring to FIG. 28, processing which is carried out when a predetermined process was designated from the FIG. 21 screen, will be described hereinafter.

[S60] The slip information management block 34 obtains information of rights of a user.

[S61] The slip information management block 34 obtains a log of a slip correlated with the designated process.

[S62] The slip information management block 34 obtains logs of child slips correlated with the designated process, or logs of further descendant slips at a lower hierarchical level than the level of the child slips.

[S63] The slip information management block 34 compares authorization information added to the slips and the information of the rights of the user, and excludes information which the user is not authorized to access.

[S64] The slip information management block 34 displays only the status of information which the user is authorized to access, on the display device 22-1.

The above processing makes it possible to display a screen as shown in FIG. 22, when a predetermined process is designated on a process flow screen as shown in FIG. 21.

Although in the above examples of processing, a received slip is immediately processed and transmitted to next companies, this is not limitative, but they can be processes e.g. after being stored only for a predetermined time period.

If this variation of the above processing is employed, when orders are placed for an identical product with an identical company, it becomes possible to combine the slips for the orders into a single slip.

Figure 29:
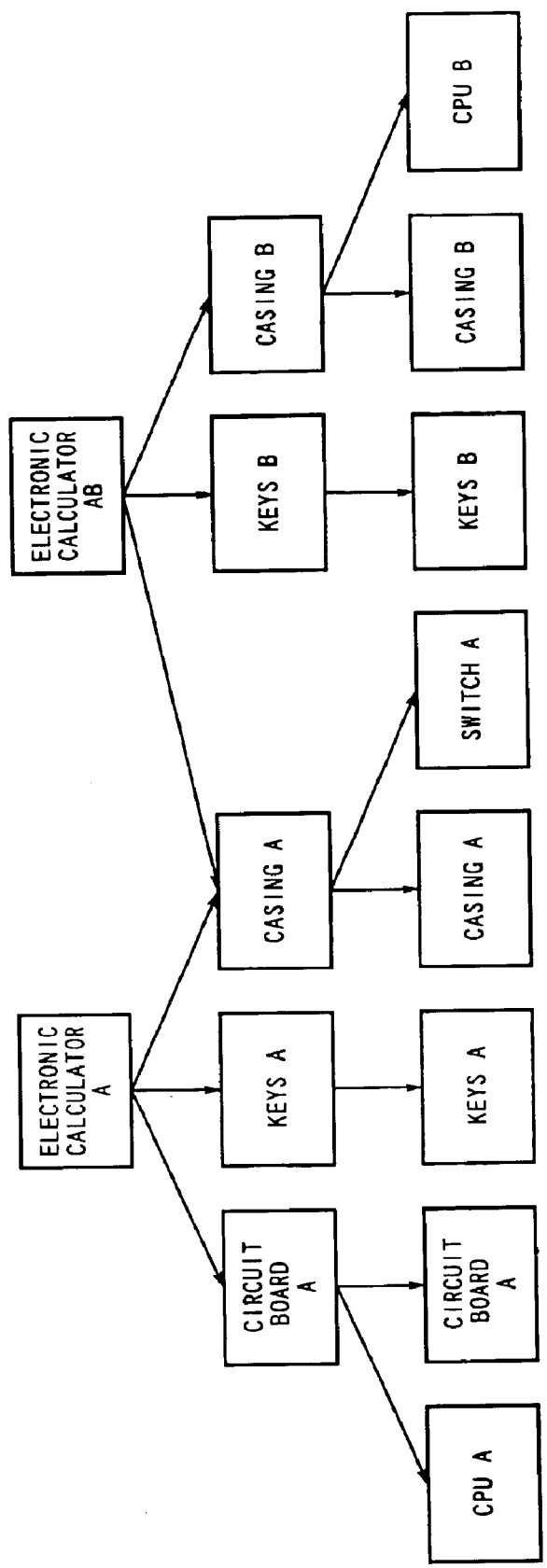
FIG. 29 is a diagram showing a hierarchical structure of products which have some components in common.

FIG. 29 shows an example of such a case. In the illustrated example, the electronic calculator A and an electronic calculator AB have the casing A as a common component. As described above, when a plurality of kinds of products use common components, or when products of the same kind are ordered successively, it becomes possible to combine their order slips into a single slip, and send the single slip to a company or the like at a lower hierarchical level. This facilitates making settlement of an account.

Although in the above embodiment, a case in which the present invention is applied to slips is described by way of example, this is not limitative, but it goes without saying that the invention can be applied to electronic documents other than slips.

Further, although in the above embodiment, slip management tables and tables indicating parent-child relationship between slips are stored in the same storehouse, this is not limitative, but they can be managed in a decentralized manner.

Further, in the present embodiment, electronic documents are processed separately by individual servers, so that processing operations can be executed in parallel with each other, which makes it possible to increase the processing speed.

Finally, the above processing functions can be implemented by a computer. In such a case, the details of processing functions that the electronic document processor should have are described in a program stored in a computer-readable recording medium. By executing the program by a computer, it is possible to perform the above-described processes. The computer-readable recording media includes a magnetic recording device, semiconductor memory and the like. To distribute the program to the market, the program may be stored in portable recording medium such as CD-ROMs (Compact Disk Read Only Memories) or floppy disks. Alternatively, the program may be stored in the storage device of a computer connected to a network and may be transferred to other computers through the network. To execute the program by a computer, the program stored in a hard disk unit or the like of the computer is loaded into the main memory and executed.

As described hereinbefore, according to the present invention, in an electronic document processing system including a plurality of electronic document processors connected to each other by a network, each electronic document processor comprises reception means for receiving an electronic document transmitted from another of the electronic document processors, processing means for carrying out predetermined processing on the electronic document received by the reception means, first storage means for generating a log of the processing carried out by the processing means and storing the log in a predetermined resource, derivative electronic document generation means for generating a derivative electronic document which is a new electronic document derived from the electronic document, according to a result of the processing carried out by the processing means, second storage means for storing information indicating a correlation between the electronic document and the derivative electronic document in a predetermined resource, when the derivative electronic document is generated by the derivative electronic document generation means, and transmission means for transmitting the electronic document processed by the processing means and the derivative electronic document generated by the derivative electronic document generation means to a next one of said electronic document processors. Therefore, it becomes possible to set and maintain correlation between an original electronic document and derivative electronic documents when the derivative electronic documents are generated, thereby enabling tracking of electronic documents produced after the generation of the derivative electronic documents.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. An electronic document processing system including a plurality of electronic document processors connected to each other by a network, wherein each of said electronic document processors comprising:

reception means for receiving an electronic document transmitted from another of said electronic document processors;

processing means for carrying out predetermined processing on said electronic document received by said reception means;

first storage means for generating a log of said predetermined processing carried out by said processing means, and storing said log in a predetermined resource;

derivative electronic document generation means for generating a derivative electronic document which is a new electronic document derived from said electronic document, according to a result of said predetermined processing carried out by said processing means;

second storage means for storing information indicating a correlation between said electronic document and said derivative electronic document in a predetermined resource, when said derivative electronic document is generated by said derivative electronic document generation means;

transmission means for transmitting said electronic document processed by said processing means and said derivative electronic document generated by said derivative electronic document generation means to a next one of said electronic document processors;

tracking request entry means for receiving a tracking request for tracking a predetermined electronic document; and status display means for obtaining a log corresponding to said predetermined electronic document from said predetermined resource, and displaying information indicating a present status of said predetermined electronic document, when said tracking request for tracking said predetermined electronic document is made by said tracking request entry means, wherein said status display means displays a status of said derivative electronic document correlated with said electronic document of which said tracking request was made, by also referring to said information indicating said correlation between said electronic document and said derivative electronic document.

2. An electronic document processing system according to claim 1, wherein when a plurality of derivative electronic documents to be generated contain a common content, said derivative electronic document generation means combines said plurality of derivative electronic documents into a single derivative electronic document.

3. An electronic document processing system according to claim 1, wherein said electronic document contains first access limiting information for limiting access of users to said electronic document, said each electronic document processor including access permitting means responsive to a request of access to said electronic document, for permitting only an authorized user to gain said access to said electronic document, through comparison with rights of users and said first access limiting information; and wherein said log contains second access limiting information for limiting access of users to said log, said access permitting means being responsive to a request of access to said log, for permitting only an authorized user to gain said access to said log, through comparison with said rights of said users and said second access limiting information.

4. An electronic document processing system according to claim 1, wherein said log has information indicating a status of a business process written therein, said business process being started by reception of said electronic document, said status display means also displaying information indicating said status of said business process as status information.

5. An electronic document processor connected to other electronic document processors via a network, for transmission and reception of electronic documents therebetween, the electronic document processor comprising:

reception means for receiving an electronic document transmitted from another of said electronic document processors;

processing means for carrying out predetermined processing on said electronic document received by said reception means;

first storage means for generating a log of said predetermined processing carried out by said processing means, and storing said log in a predetermined resource;

derivative electronic document generation means for generating a derivative electronic document which is a new electronic document derived from said electronic document, according to a result of said predetermined processing carried out by said processing means;

second storage means for storing information indicating a correlation between said electronic document and said derivative electronic document in a predetermined resource, when said derivative electronic document is generated by said derivative electronic document generation means; and transmission means for transmitting said electronic document processed by said processing means and said derivative electronic document generated by said derivative electronic document generation means to a next one of said electronic document processors;

tracking request means for receiving a tracking request for tracking a predetermined electronic document; and status display means for obtaining a log corresponding to said predetermined electronic document from said predetermined resource, and displaying information indicating a present status of said predetermined electronic document, when said tracking request for tracking said predetermined electronic document is made by said tracking request entry means, wherein said status display means displays a status of said derivative electronic document correlated with said electronic document of which said tracking request was made, by also referring to said information indicating said correlation between said electronic document and said derivative electronic document.

6. A computer-readable recording medium which stores a program for an electronic computer connected to other electronic document processors via a network, for transmission and reception of electronic documents therebetween, said program causing said computer to function as:

reception means for receiving an electronic document transmitted from another of said electronic document processors;

processing means for carrying out predetermined processing on said electronic document received by said reception means;

first storage means for generating a log of said predetermined processing carried out by said processing means, and storing said log in a predetermined resource;

derivative electronic document generation means for generating a derivative electronic document which is a new electronic document derived from said electronic document, according to a result of said predetermined processing carried out by said processing means;

second storage means for storing information indicating a correlation between said electronic document and said derivative electronic document in a predetermined resource, when said derivative electronic document is generated by said derivative electronic document generation means; and transmission means for transmitting said electronic document processed by said processing means and said derivative electronic document generated by said derivative electronic document generation means to a next one of said electronic document processors;

tracking request entry means for receiving a tracking request for tracking a predetermined electronic document; and status display means for obtaining a log corresponding to said predetermined electronic document from said predetermined resource, and displaying information indicating a present status of said predetermined electronic document, when said tracking request for tracking said predetermined electronic document is made by said tracking request entry means, wherein said status display means displays a status of said derivative electronic document correlated with said electronic document of which said tracking request was made, by also referring to said information indicating said correlation between said electronic document and said derivative electronic document.

7. An electronic document processor connected to other electronic document processors via a network, comprising:

a reception unit which receives an electronic document transmitted from another of the electronic document processors;

a processor which carries out processing on the electronic document received by the reception unit;

a first storage unit which generates a log of the processing carried out by the processor, and stores the log in a resource;

a derivative electronic document generator which generates a derivative electronic document including a new electronic document derived from the electronic document, according to a result of the processing carried out by the processor;

a second storage unit which stores information indicating a correlation between the electronic document and the derivative electronic document in a resource, when the derivative electronic document is generated by the derivative electronic document generator;

a transmission unit which transmits the electronic document processed by the processor and the derivative electronic document generated by the derivative electronic document generator to a next one of the electronic document processors;

a tracking request entry unit which receives a tracking request for tracking an electronic document; and a status display which obtains a log corresponding to the electronic document from the resource, and displays information indicating a present status of the electronic document, when the tracking request for tracking the electronic document is made by the tracking request entry unit, wherein the status display displays a status of the derivative electronic document correlated with the electronic document of which the tracking request was made, by also referring to the information indicating the correlation between the electronic document and the derivative electronic document.

* * * * *

UNITED STATES PATENT AND TRADEMARK OFFICE
CERTIFICATE OF CORRECTION

PATENT NO.    : 6,874,124 B2
DATED         : March 29, 2005
INVENTOR(S)   : Takeo Murase et al.

It is certified that error appears in the above-identified patent and that said Letters Patent is hereby corrected as shown below:

Column 17,
Line 60, after "request" insert -- entry --.

Signed and Sealed this

Fifteenth Day of November, 2005

JON W. DUDAS
*Director of the United States Patent and Trademark Office*